(12) United States Patent
Engler et al.

(10) Patent No.: US 12,614,370 B2
(45) Date of Patent: Apr. 28, 2026

(54) EXPOSURES FOR AREAS OF IMAGE SENSORS

(71) Applicant: Hewlett-Packard Development Company, L.P., Spring, TX (US)

(72) Inventors: David Engler, Spring, TX (US); Chi Wai So, Spring, TX (US); Yun David Tang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 46 days.

(21) Appl. No.: 18/684,111

(22) PCT Filed: Sep. 17, 2021

(86) PCT No.: PCT/US2021/050960
§ 371 (c)(1),
(2) Date: Feb. 15, 2024

(87) PCT Pub. No.: WO2023/043457
PCT Pub. Date: Mar. 23, 2023

(65) Prior Publication Data
US 2024/0378849 A1      Nov. 14, 2024

(51) Int. Cl.
| | |
|---|---|
| *G06V 10/60* | (2022.01) |
| *G06T 7/90* | (2017.01) |
| *G06V 10/25* | (2022.01) |
| *G06V 10/56* | (2022.01) |
| *G06V 20/40* | (2022.01) |

(52) U.S. Cl.
CPC .............. *G06V 10/60* (2022.01); *G06T 7/90* (2017.01); *G06V 10/25* (2022.01); *G06V* *10/56* (2022.01); *G06V 20/46* (2022.01); *G06T* *2207/20208* (2013.01); *G06T 2207/20221* (2013.01)

(58) Field of Classification Search
CPC ... G06T 5/90; G06T 7/90; G06T 2207/20208; G06T 2207/20221; G06V 20/46; G06V 10/56; G06V 10/25; G06V 10/60; H04N 23/70; H04N 23/73
See application file for complete search history.

(56) References Cited

U.S. PATENT DOCUMENTS

| | | | |
|---|---|---|---|
| 6,687,400 | B1 | 2/2004 | Szeliski |
| 7,397,505 | B2 | 7/2008 | Brehmer et al. |
| 7,538,801 | B2 | 5/2009 | Hu et al. |
| 8,194,153 | B2 | 6/2012 | Asoma |
| 8,237,809 | B2 | 8/2012 | Mertens |
| 8,766,902 | B2 | 7/2014 | Barnhoefer et al. |
| 8,976,257 | B2 | 3/2015 | Chen et al. |
| 9,014,504 | B2 | 4/2015 | Lim et al. |
| 9,986,169 | B2 | 5/2018 | Morales et al. |
| 2002/0110376 | A1 | 8/2002 | MacLean et al. |
| 2010/0026825 | A1* | 2/2010 | Doida ................... G06T 3/4053 |
| | | | 348/222.1 |
| 2012/0069212 | A1 | 3/2012 | Imai |
| 2014/0247376 | A1 | 9/2014 | Kuwata |

(Continued)

*Primary Examiner* — Kelly L Jerabek
(74) *Attorney, Agent, or Firm* — Quarles & Brady LLP

(57) ABSTRACT

In some examples, an electronic device includes a processor to detect a saturated highlight of a video frame. In response to the detection, the processor is to identify an area of the saturated highlight and adjust an exposure of an image sensor for the area of the saturated highlight.

20 Claims, 9 Drawing Sheets

(56) References Cited

U.S. PATENT DOCUMENTS

| | | | | |
|---|---|---|---|---|
| 2016/0142608 | A1* | 5/2016 | Afrooze | H04N 23/70 |
| | | | | 348/222.1 |
| 2018/0341804 | A1* | 11/2018 | Takayama | G06V 10/60 |
| 2019/0082091 | A1 | 3/2019 | Case | |
| 2021/0110190 | A1* | 4/2021 | Park | H04N 23/71 |
| 2021/0360139 | A1* | 11/2021 | Mcelvain | H04N 25/583 |
| 2022/0159168 | A1* | 5/2022 | Yu | G06V 10/14 |
| 2023/0042544 | A1* | 2/2023 | Lee | H04N 23/811 |

* cited by examiner

300

302 Start image processing

304 Detect blown highlight

306 Identify area of blown highlight

310 Adjust exposure of image sensor

312 Receive another image

314 Display the another image

400

404 Image Sensor

402 Processor

406

408 Detect a blown highlight of a video frame

410 Identify an area of the blown highlight

412 Adjust an exposure of an image sensor for the area

EXPOSURES FOR AREAS OF IMAGE SENSORS

BACKGROUND

Electronic devices such as desktops, laptops, notebooks, tablets, and smartphones include image sensors that enable the electronic devices to capture and transmit images. Different attributes (e.g., a field of view, a dynamic range, an exposure) of an image sensor determine a quality of an image captured by the image sensor. The field of view of the image sensor determines an area of a physical environment of the image sensor that the image sensor can capture. The dynamic range of the image sensor determines a range of tonal values (e.g., a darkness to brightness range) that the image sensor can capture. The exposure of the image sensor determines an amount of light that the image sensor can capture.

BRIEF DESCRIPTION OF THE DRAWINGS

Various examples are described below referring to the following figures.

DETAILED DESCRIPTION

Figures 1, 2A, 2B:
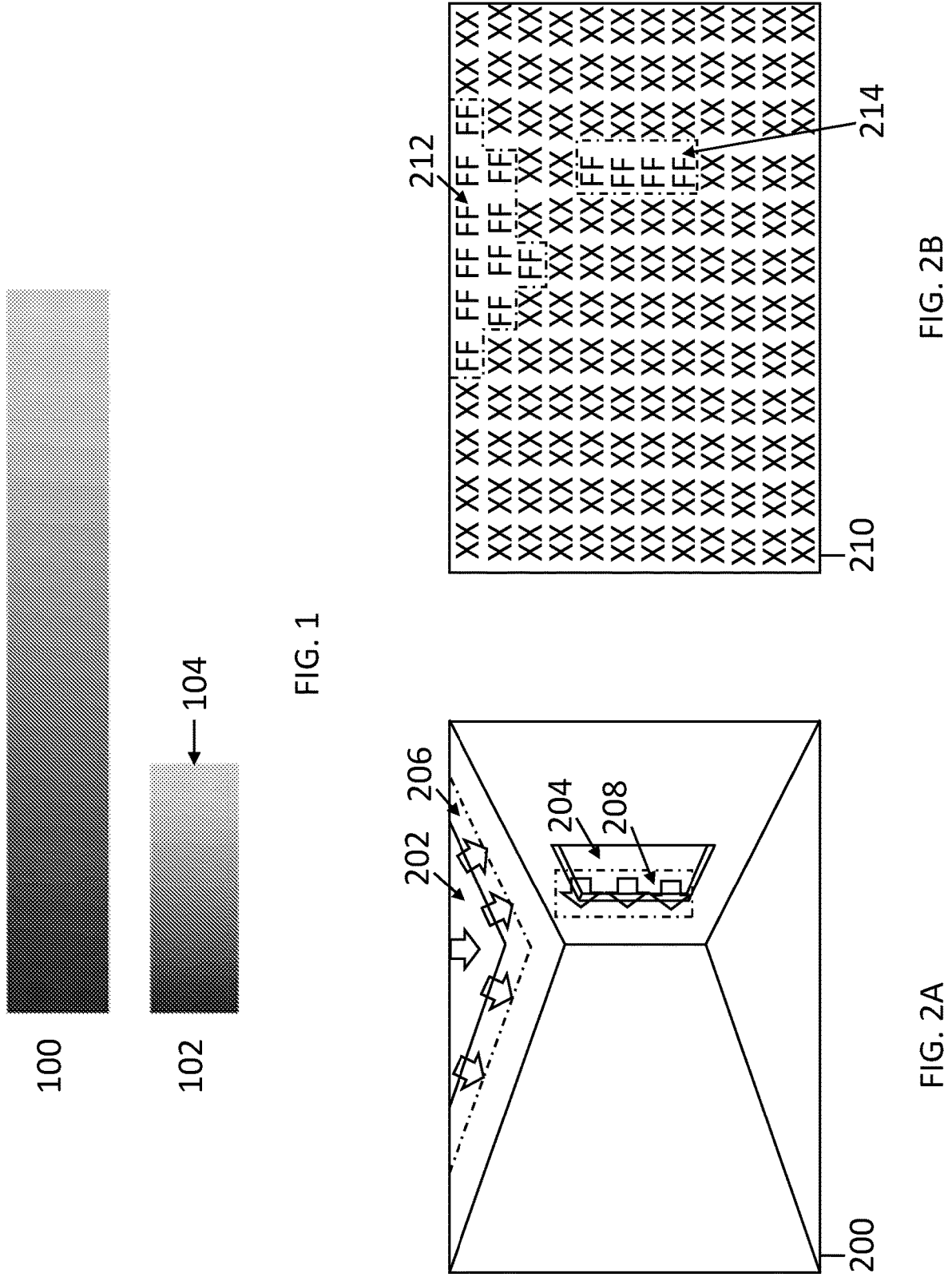
FIG. 1 is an example of a dynamic range of an image sensor, in accordance with various examples.
FIGS. 2A and 2B are examples of images captured by an image sensor, in accordance with various examples.

As described above, electronic devices include image sensors that enable the electronic devices to capture and transmit images. For instance, an electronic device utilizes an image sensor to facilitate virtual meetings between a user of the electronic device and an audience. During a virtual meeting, a field of view of the image sensor captures a physical environment of the image sensor. The image of the physical environment includes features not present in the physical environment. Artifacts, as used herein, refer to the features present in the image of the physical environment but not present in the physical environment.

In some instances, the field of view of the image sensor includes a brightness source (e.g., a light source, a reflective object, or a combination thereof). Because of the dynamic range and the exposure of the image sensor, the image sensor may be unable to properly process an amount of light provided by the brightness source, and an area of the image may have the largest value of the range of tonal values of the dynamic range. The area that has saturated the largest value of the range of tonal values is an artifact referred to as a saturated highlight. The saturated highlight may encompass an area beyond a location of the brightness source. For instance, the saturated highlight may also hinder the image sensor from capturing fine details (e.g., a texture or an edge) of another object that is in proximity to the source of brightness. The saturated highlight distracts the user, an audience that receives the image, or a combination thereof. The user may attempt to remove or reduce the saturated highlight by rearranging elements (e.g., the electronic device, the brightness source, the image sensor) of the physical environment of the image sensor or by adjusting an exposure of the image sensor. However, the user's attempts may be disruptive to the audience and interfere with the user participating with the audience, thereby reducing the user and the audience experience and impacting user productivity. Additionally, adjusting the exposure of the image sensor may hinder the image sensor from capturing fine details of other objects of the image by generating areas having increased darkness.

This description describes examples of an electronic device to detect saturated highlights within an area of an image recorded via an image sensor and to correct the image by reducing an exposure of the image sensor for the area. During image processing, the electronic device analyzes the image to determine whether the image includes a saturated highlight. In some examples, the electronic device utilizes a machine learning technique to monitor a video signal received via the image sensor for the image that includes the saturated highlight. Responsive to a determination that the image includes the saturated highlight, the electronic device determines an area of the saturated highlight. In some examples, the electronic device identifies an object within the saturated highlight and determines whether the object is stationary. Responsive to the electronic device determining that the object is stationary, the electronic device determines the area of the saturated highlight. The electronic device adjusts an exposure of the image sensor for the area of the saturated highlight. The electronic device causes the display, the transmission, or a combination thereof of another image received via the image sensor having the adjusted exposure for the area of the saturated highlight. In some examples, the electronic device adjusts the exposure of the image sensor for the area of the saturated highlight and generate a composite image. For example, the electronic device generates the composite image by averaging brightness values of an area of a saturated highlight of the another image received via the image sensor having the adjusted exposure with brightness values for pixels separate from, but contiguous with, the area of the saturated highlight of the another image. In another example, the electronic device generates the composite image by combining brightness values of multiple images received via the image sensor having the adjusted exposure for the area of the saturated highlight. The electronic device causes the composite image to be displayed, transmitted, or a combination thereof.

By correcting the saturated highlight in the image and causing the display or transmission of the corrected image, the electronic device enhances a visibility of the physical environment of the image sensor without the user taking corrective actions. Additionally, the user and audience experiences are enhanced by eliminating the awkwardness that would otherwise occur while the user takes the corrective action. By automatically correcting the saturated highlights, the electronic device enhances user productivity.

In examples in accordance with the present description, an electronic device is provided. The electronic device includes a processor to detect a saturated highlight of a video frame. In response to the detection, the processor is to identify an area of the saturated highlight and adjust an exposure of an image sensor for the area of the saturated highlight.

In other examples in accordance with the present description, an electronic device is provided. The electronic device includes a processor to detect an artifact of an image. In response to the detection, the processor is to identify an object within the artifact of the image. In response to determining that the object satisfies a criterion, the processor is to identify an area of the artifact using the object and adjust an exposure of an image sensor for the area of the artifact.

In yet other examples in accordance with the present description, a non-transitory machine-readable medium storing machine-readable instructions is provided. The machine-readable instructions, when executed by a processor, cause the processor to monitor a video signal for a frame that includes a saturated highlight. The video signal is received from an image sensor. In response to receiving the frame that includes the saturated highlight, the machine-readable instructions, when executed by the processor, cause the processor to determine whether the saturated highlight is stationary. In response to a determination that the saturated highlight is stationary, the machine-readable instructions, when executed by the processor, cause the processor to determine an area of the saturated highlight and adjust an exposure of the image sensor for the area of the saturated highlight.

Referring now to FIG. 1, an example of a dynamic range 102 of an image sensor is provided, in accordance with various examples. A dynamic range 100 represents a range of tonal values that is perceivable by a human eye. The dynamic range 102 represents a range of tonal values that is perceivable by the image sensor. The dynamic range 102 includes the largest value 104 of the range of tonal values. For example, the largest value 104 represents a brightest white tone.

In various examples, the largest value 104 is a largest value of a range of tonal values for a color space. For example, for a black and white color space, the range of tonal values is zero to 255. The largest value 104 is 255. In some examples, the largest value 104 is represented as the hexadecimal number FF. While the description describes examples of the largest value 104 of the range of tonal values for a black and white color space, in other examples, the largest value 104 is a largest value of the range of tonal values for a Red Green Blue (RGB) color space. The range of tonal values is zero to 255 for red, blue, and green, respectively. The largest value 104 is 255, 255, 255, or the hexadecimal number FFFFFF.

Referring now to FIGS. 2A and 2B, examples of images 200, 210 captured by an image sensor are provided, in accordance with various examples. FIG. 2A shows the image 200. The image 200 is an image of a physical environment of the image sensor. The image 200 includes light sources 202, 204 and saturated highlights 206, 208. The light source 202 is a light fixture, for example. The light source 204 is a window that allows sunlight to enter the physical environment. The saturated highlights 206, 208 are areas of the image 200 that appear as bright white. The arrows of the image 200 indicates a direction of light provided by the light sources 202, 204. FIG. 2B shows the image 210. The image 210 includes areas 212, 214. The areas 212, 214 are pixels of the image 210 that are a largest value of a range of tonal values for a color space. For example, the pixels of the areas 212, 214 have the values FF. The values of the remaining areas of the image 210 are represented by XX to indicate values other than the largest value of the range of tonal values for the color space.

In some examples, the saturated highlights 206, 208 overlap an area of the light sources 202, 204. For example, the saturated highlight 206 overlaps the area of the light source 202, and the saturated highlight 208 partially overlaps the light source 204. In various examples, the image 210 is a pixelated representation of the image 200. The saturated highlights 206, 208 are the areas 212, 214, respectively. The area 212 overlaps the area of the light source 202 and pixels that represent the light source 202 have a value of FF. The area 214 partially overlaps the area of the light source 204 and a subset of the pixels of the light source 204 have values of FF. Another subset of the pixels of the light source 204 have values represented by XX.

In various examples, a value for the largest value of the range of tonal values for the color space is adjustable. For example, the user adjusts the largest value utilizing a graphical user interface (GUI) of an executable code. As used herein, adjusting the largest value adjusts a value utilized to detect a saturated highlight. For example, responsive to the user adjusting the largest value to FD, the areas 212, 214 have values between FD and FF (e.g., FD, FE, FF).

Figures 3, 4:
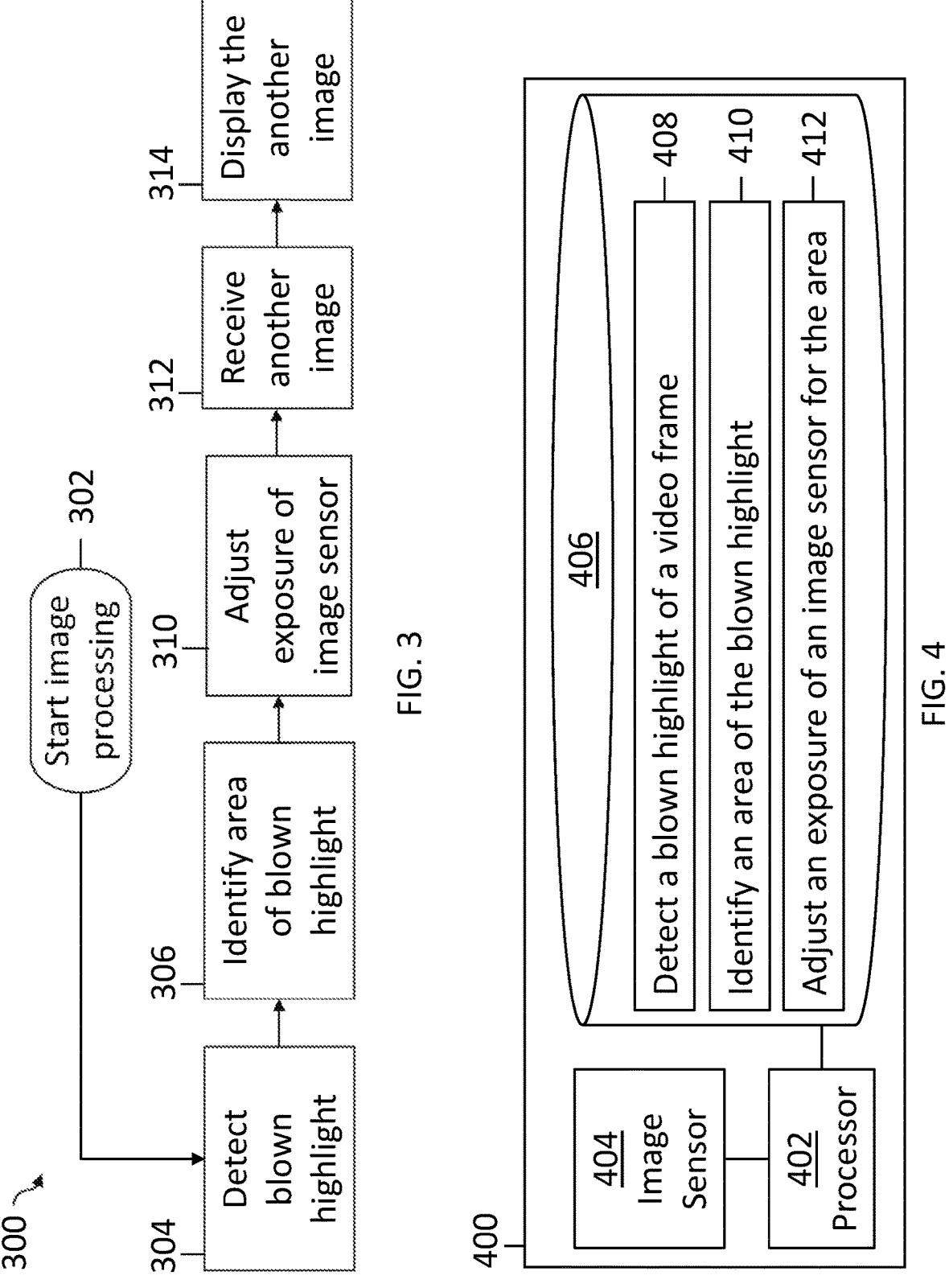
FIG. 3 is a flow diagram of a method for adjusting exposures of areas of an image sensor, in accordance with various examples.
FIG. 4 is a schematic diagram depicting an electronic device for adjusting exposures of areas of an image sensor, in accordance with various examples.

Referring now to FIG. 3, a flow diagram of a method 300 for adjusting exposures of areas of an image sensor is provided, in accordance with various examples. An electronic device performs the method 300, as described below with respect to FIG. 4. At a start point 302 of the method 300, the electronic device starts image processing. At the start point 302, the electronic device receives an image (e.g., the image 200, 210) captured by the image sensor. During a detect process 304 of the method 300, the electronic device detects a saturated highlight (e.g., the saturated highlight 206, 208). During an identify process 306 of the method 300, the electronic device identifies an area of the saturated highlight (e.g., the area 212, 214). The electronic device adjusts an exposure of an area of the image sensor during an adjust process 310 of the method 300. The electronic device receives another image during a receive process 312 of the method 300. During a display process 314 of the method 300, the electronic device causes a display device to display the another image, a network interface to transmit the another image, or a combination thereof.

In various examples, the electronic device utilizes an image processing technique, a machine learning technique, or a combination thereof during the detect process 304, the identify process 306, or a combination thereof. The image processing technique includes grayscaling, creating a histogram, thresholding, or a combination thereof. In some examples, during the detect process 304, the electronic device converts the image into grayscale. Pixels of the image having the largest value (e.g., the largest value 104) of the black and white color scale indicate a saturated highlight, for example. In other examples, during the detect process 304, the electronic device creates a histogram of the image. The histogram is a graphical chart that shows the tonal distribution of the image. The x-axis of the histogram has values of the range of tonal values of the color scale. Saturated highlights of the image are located at the largest value of the x-axis.

In some examples, responsive to a determination that the saturated highlight is a distraction, the electronic device performs the identify process 306. For example, responsive to a determination that the number of pixels of the saturated highlight is equivalent to or less than twenty, the electronic device determines that the saturated highlight is not a distraction. In other examples, the electronic device determines that an area of the saturated highlight is a percentage of the area of the video frame. Responsive to a determination that the percentage is equivalent to or less than five percent, the electronic device determines that the saturated highlight is not a distraction, for example. In various examples, the values utilized by the electronic device to determine whether the saturated highlight is a distraction is adjustable. For example, utilizing the GUI of the executable code, the user adjusts the number of pixels, the percentage, or a combination thereof that the saturated highlight is to exceed for the electronic device to determine that the saturated highlight is a distraction.

In various examples, the electronic device utilizes a machine learning technique such as a Convolutional Neural Network (CNN) to detect the saturated highlight, during the detect process 304. The CNN utilizes a Visual Geometry Group (VGG) model (e.g., VGGNet), a SqueezeNet model, or an AlexNet model, for example. In some examples, the CNN is trained utilizing multiple images having saturated highlights; multiple images having white objects, naturally bright regions, or a combination thereof; multiple images having expected brightness and distribution; or some combination thereof. The trained CNN analyzes the image to detect the saturated highlight, identify the saturated highlight, or a combination thereof.

In some examples, during the identify process 306, the electronic device performs thresholding on the image to segment the saturated highlight from a remaining portion of the image. During thresholding, the electronic device converts pixels having values less than a tonal threshold to black. For example, the tonal threshold is the largest value of the range of tonal values. In another example, the tonal threshold is adjustable.

During the adjust process 310, the electronic device adjusts the exposure of the image sensor for the area indicated by a mask. The mask, as used herein, is data for the field of view of the image sensor, where the data indicates which area or areas of the field of view are to be adjusted and which area or areas of the field of view maintain a previous setting. In some examples, the electronic device generates the mask so that the image sensor has a first exposure for a first area of a field of view of the image sensor and a second exposure for a remaining area of the field of view of the image sensor. In various examples, the first area of the field of view of the image sensor corresponds to the area of the saturated highlight and the second area of the field of view of the image sensor corresponds to an area of another saturated highlight, and the third area of the field of view of the image sensor maintains a previous setting.

In some examples, the electronic device adjusts a brightness setting, an exposure setting, or a combination thereof of the image sensor in an executable code that controls the image sensor. In other examples, the electronic device adjusts the exposure of the image sensor by adjusting an aperture setting, a shutter speed setting, a sensitivity setting, or a combination thereof. The aperture setting controls an area over which light enters the image sensor. The shutter speed setting controls a duration of the exposure. The sensitivity setting controls a sensitivity to light of the image sensor. The sensitivity setting implements a standard such as an International Organization of Standards (ISO) standard (e.g., ISO 12232:2006). By adjusting the exposure of the area of the image sensor, the electronic device reduces an appearance of crushed shadows in subsequent images. Crushed shadows are areas of the image that have the smallest value of the range of tonal values of the dynamic range. A crushed shadow is an artifact generated by underexposure of the image sensor. By adjusting the exposure of the area, the electronic device blocks underexposure of other areas, thereby reducing the appearance of crushed shadows.

A process, as used herein, refers to operations performed by execution of machine-readable instructions of a processor of an electronic device. A decision point, as used herein, refers to operations performed by execution of machine-readable instructions by the processor. Unless infeasible, some or all of the blocks (e.g., process, decision point) of the method 300 may be performed concurrently or in different sequences. For example, while in the examples described above the electronic device performs the detect process 304 and the identify process 306 sequentially, in other examples, the electronic device performs the detect process 304 and the identify process 306 simultaneously.

Referring now to FIG. 4, a schematic diagram depicting an electronic device 400 for adjusting exposures of areas of an image sensor 404 is provided, in accordance with various examples. The electronic device 400 includes a processor 402, the image sensor 404, and a storage device 406. The processor 402 is a microprocessor, a microcomputer, a microcontroller, or another suitable processor or controller for processing images. For example, the processor 402 is a central processing unit (CPU), a graphics processing unit (GPU), a video processing unit (VPU), or an image signal processor (ISP). The image sensor 404 is an internal camera, an external camera, or any other suitable device for capturing an image, recording a video signal, or a combination thereof. The storage device 406 is a hard drive, solid state drive (SSD), flash memory, random access memory (RAM), or other suitable memory for storing data or executable code of the electronic device 400.

While not explicitly shown, the electronic device 400 includes network interfaces, video adapters, sound cards, local buses, input/output devices (e.g., a keyboard, a mouse, a touchpad, a speaker, a microphone, a display device), wireless transceivers, connectors, or a combination thereof. While the image sensor 404 is shown as an integrated image sensor of the electronic device 400, in other examples, the image sensor 404 couples to any suitable connection for enabling communications between the electronic device 400 and the image sensor 404. The connection may be via a wired connection (e.g., a Universal Serial Bus (USB)) or via a wireless connection (e.g., BLUETOOTH®, WI-FI®).

In some examples, the processor 402 couples to the image sensor 404 and the storage device 406. The storage device 406 stores machine-readable instructions which, when executed by the processor 402, cause the processor 402 to perform some or all of the actions attributed herein to the processor 402. The machine-readable instructions are the machine-readable instructions 408, 410, 412.

In various examples, the machine-readable instructions 408, 410, 412, when executed by the processor 402, cause the processor 402 to adjust an exposure of an area of the image sensor 404. The machine-readable instruction 408, when executed by the processor 402, causes the processor 402 to detect a saturated highlight (e.g., the saturated highlight 206, 208) of a video frame (e.g., the image 200, 210). The video frame is recorded via the image sensor 404. The machine-readable instruction 410, when executed by the processor 402, causes the processor 402 to identify an area (e.g., the area 212, 214) of the saturated highlight. The machine-readable instruction 410, when executed by the processor 402, causes the processor 402 to adjust an exposure of the image sensor for the area.

In some examples, electronic device 400 performs the method 300. For example, the method 300 is implemented by machine-readable instructions stored to the storage device 406. The processor 402 executes the machine-readable instructions to perform the method 300. In various examples, when executed by the processor 402, the machine-readable instruction 408 causes the processor 402 to perform the detect process 304. When executed by the processor 402, the machine-readable instruction 410 causes the processor 402 to perform the identify process 306. When executed by the processor 402, the machine-readable instruction 412 causes the processor 402 to perform the adjust process 310. In various examples, during the receive process 312, the processor 402 receives another video frame recorded via the image sensor 404, the another video frame having a first exposure for the area of the saturated highlight detected during the detect process 304 and a second exposure for a remaining area of the another video frame. The processor 402 causes a display device (not explicitly shown) to display the another video frame, a network interface (not explicitly shown) to transmit the another video frame, or a combination thereof. In some examples, to detect the saturated highlight of the video frame, the processor 402 compares the video frame to a previous video frame. In some examples, the previous video frame is stored to the storage device 406. For example, the processor 402 compares a grayscale of the video frame to a grayscale of the previous video frame. The grayscale of the previous video frame is stored to the storage device 406 in various examples. The processor 402 detects the saturated highlight by identifying a shared area of the grayscale of the video frame and the grayscale of the previous video frame having the largest value of the range of tonal values. In another example, the processor 402 compares a histogram of the video frame to a histogram of the previous video frame. The histogram of the previous video frame is stored to the storage device 406, in some examples. The processor 402 detects the saturated highlight by identifying a shared area of the histogram of the video frame and the histogram of the previous video frame having the largest value of the range of tonal values.

In various examples, to identify the area of the saturated highlight of the video frame, the processor 402 performs a thresholding of the video frame and compare the thresholding of the video frame to a thresholding of the previous video frame. The thresholding of the previous video frame is stored to the storage device 406 in various examples. The processor 402 identifies the area by identifying a shared area of the saturated highlight within the thresholding of the video frame and the thresholding of the previous video frame.

As described above with respect to FIG. 3, to adjust the exposure of the image sensor for the area of the saturated highlight the processor 402 generates a mask so that the image sensor has a first exposure for a first area of a field of view of the image sensor and a second exposure for a remaining area of the field of view of the image sensor. The first area of the field of view of the image sensor corresponds to the area of the saturated highlight. In other examples, the processor 402 generates a mask so that the image sensor has a first exposure for a first area of a field of view of the image sensor, a second exposure for a second area of the field of view of the image sensor, and a third exposure for a third area of the field of view of the image sensor. The first area of the field of view of the image sensor corresponds to the area of the saturated highlight, the second area of the field of view of the image sensor corresponds to an area of another saturated highlight, and the third area of the field of view of the image sensor corresponds to a remaining area of the field of view of the image sensor.

Figure 5B:
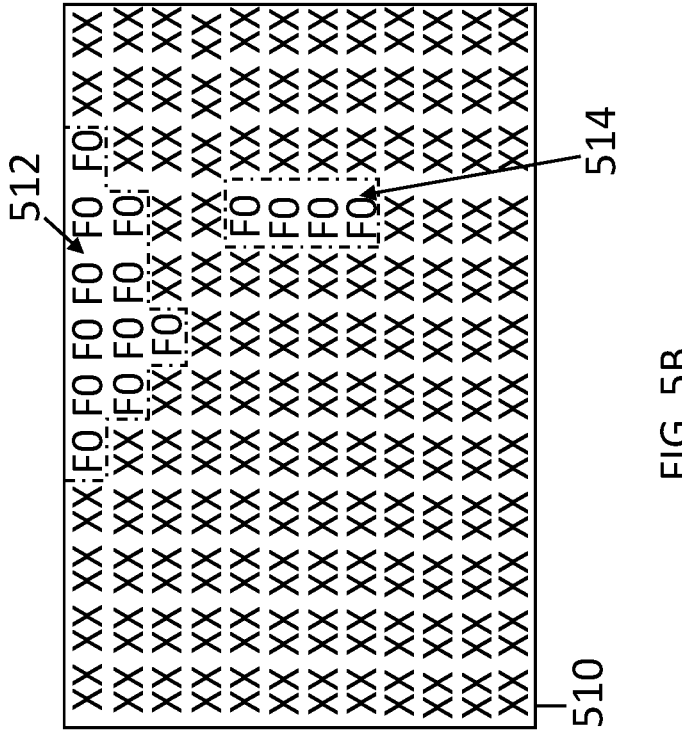
FIGS. 5A and 5B are examples of video frames captured by an image sensor, in accordance with various examples.
Figure 5A:
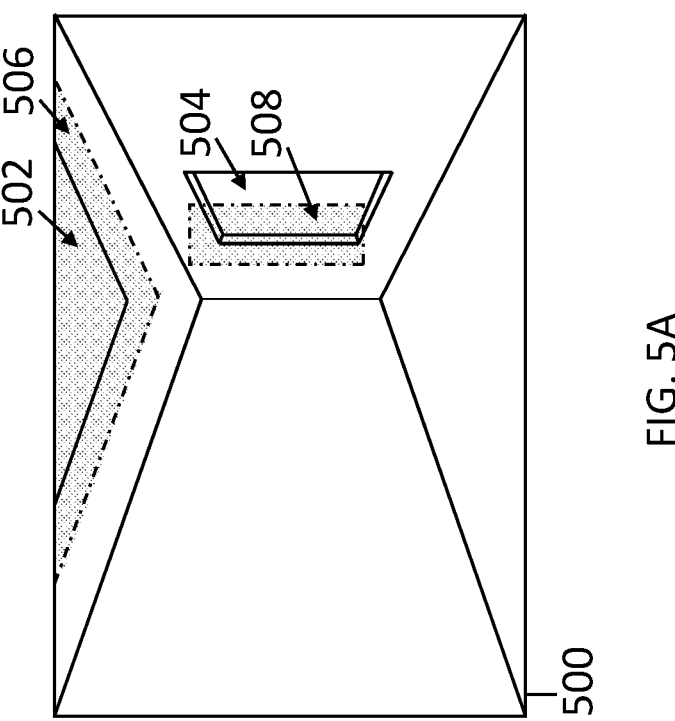

Referring now to FIGS. 5A and 5B, examples of video frames 500, 510 captured by an image sensor (e.g., the image sensor 404) are provided, in accordance with various examples. FIG. 5A shows the video frame 500. The video frame 500 is a frame of a video of a physical environment of the image sensor. The video frame 500 includes light sources 502, 504 and areas 506, 508. The areas 506, 508 are areas having an adjusted exposure, as indicated by the white-dotted gray area. FIG. 5B shows the video frame 510. The video frame 510 includes areas 512, 514. The areas 512, 514 may be the areas 506, 508, respectively. The pixels of the areas 512, 514 have the values F0. The values of the remaining areas of the video frame 510 are represented by XX to indicate values other than the largest value of the range of tonal values for the color space.

In some examples, the video frame 500 is a subsequent video frame to a video frame represented by the image 200. The light sources 502, 504 are the light sources 202, 204, respectively. The areas 506, 508 are areas of the saturated highlights 206, 208, respectively. The white-dotted gray areas indicate that an electronic device (e.g., the electronic device 400) adjusted an exposure of the image sensor for the areas. By correcting the saturated highlights 206, 208 in the video frame 500, the electronic device enhances a visibility of the physical environment of the image sensor without the user taking corrective actions. Additionally, the user and audience experiences are enhanced by eliminating the awkwardness that would otherwise occur while the user takes the corrective action. By automatically correcting the saturated highlights 206, 208, the electronic device enhances user productivity.

Figure 6:
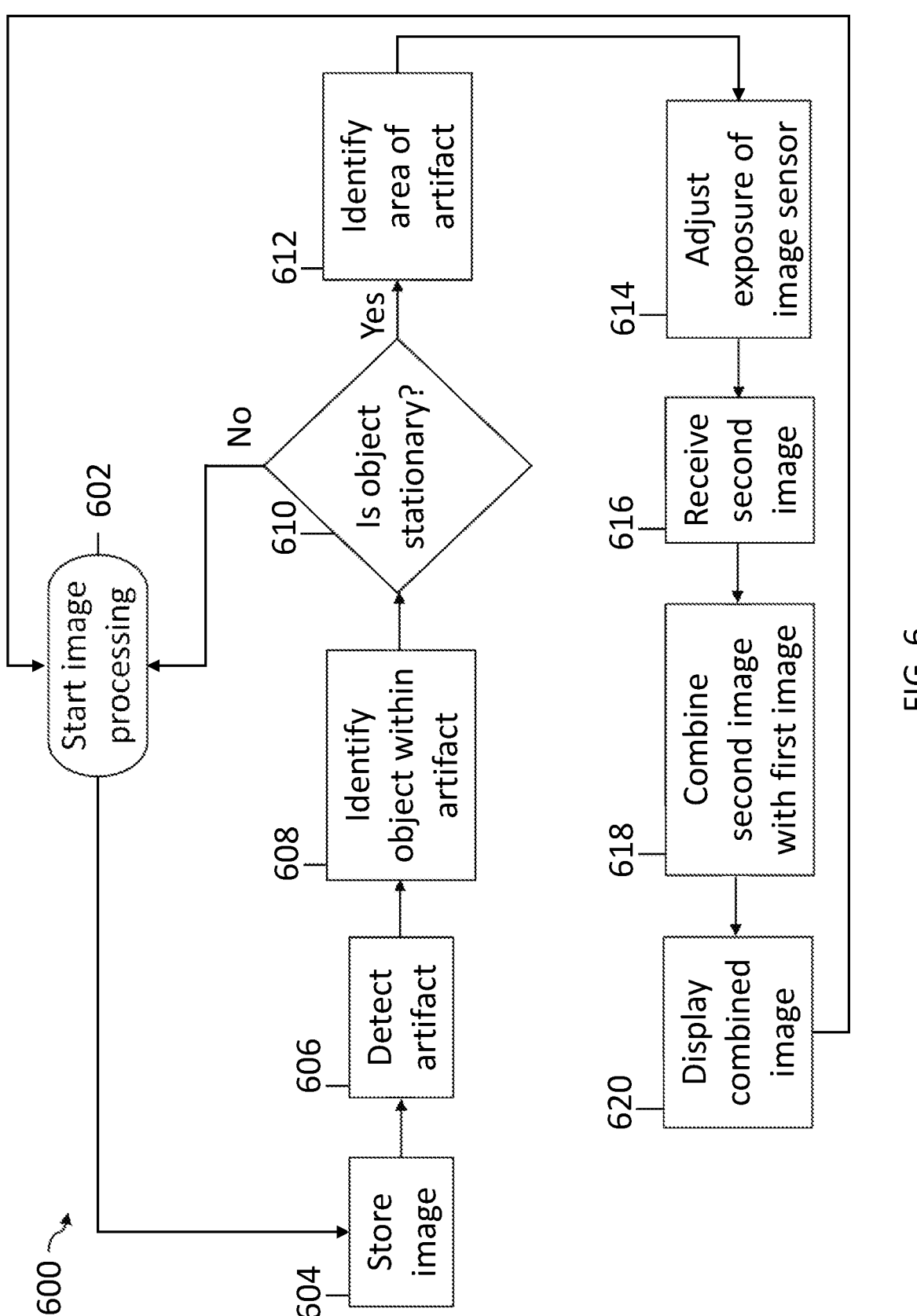
FIG. 6 is a flow diagram of a method for adjusting exposures of areas of an image sensor, in accordance with various examples.

Referring now to FIG. 6, a flow diagram of a method 600 for adjusting exposures of areas of an image sensor (e.g., the image sensor 404) is provided, in accordance with various examples. At a start point 602 of the method 600, a processor (e.g., the processor 402) of an electronic device (e.g., the electronic device 400) starts image processing. At the start point 602, the processor receives an image (e.g., the image 200, the video frame 500) captured by the image sensor. The processor stores the image to a storage device (e.g., the storage device 406) during a store process 604 of the method 600. During a detect process 606 of the method 600, the processor detects an artifact (e.g., the saturated highlight 206, 208, a crushed shadow). During an identify process 608 of the method 600, the processor identifies an object within the artifact (e.g., the light source 202, 204). The processor determines whether the object is stationary at a decision point 610 of the method 600. Responsive to a determination that the object is not stationary, the processor returns to the start point 602. Responsive to a determination that the object is stationary, the processor identifies an area of the artifact during an identify process 612 of the method 600. During an adjust process 614 of the method 600, the processor adjusts an exposure of an area of the image sensor. The processor receives another image during a receive process 616 of the method 600. The processor combines the image stored during the store process 604 and the another image during a combine process 618 of the method 600. During a display process 620 of the method 600, the processor causes a display device to display the combined images, a network interface to transmit the combined images, or a combination thereof.

In various examples, the processor utilizes an image processing technique, a machine learning technique, or a combination thereof during the identify process 608, the decision point 610, the identify process 612, or a combination thereof. The image processing technique includes grayscaling, blurring, thresholding, or a combination thereof. For example, during the identify process 608, the processor converts the image to a grayscale image. The processor blurs the grayscale image to remove noise. The processor performs thresholding on the blurred grayscale image to convert the blurred grayscale image to black and white pixels. The processor determines that black pixels surrounded by white pixels may indicate an object within an artifact.

In another example, the processor utilizes a machine learning technique such as a Convolutional Neural Network (CNN) to implement a computer vision technique to identify an object within an artifact, determine whether the object is stationary, and identify an area of the artifact. The CNN utilizes a region-based model (e.g., R-CNN) to identify regions of the image that include objects, extract features of a region of the regions to determine whether the features indicate an artifact, an object within the artifact, or a combination thereof and to localize the features that indicate the artifact, the object within the artifact, or a combination thereof. In some examples, the processor utilizes the machine learning technique on multiple, consecutive images captured by the image sensor to identify the object within the artifact, determine whether the object within the artifact is stationary, and identify the area of the artifact.

Figure 7:
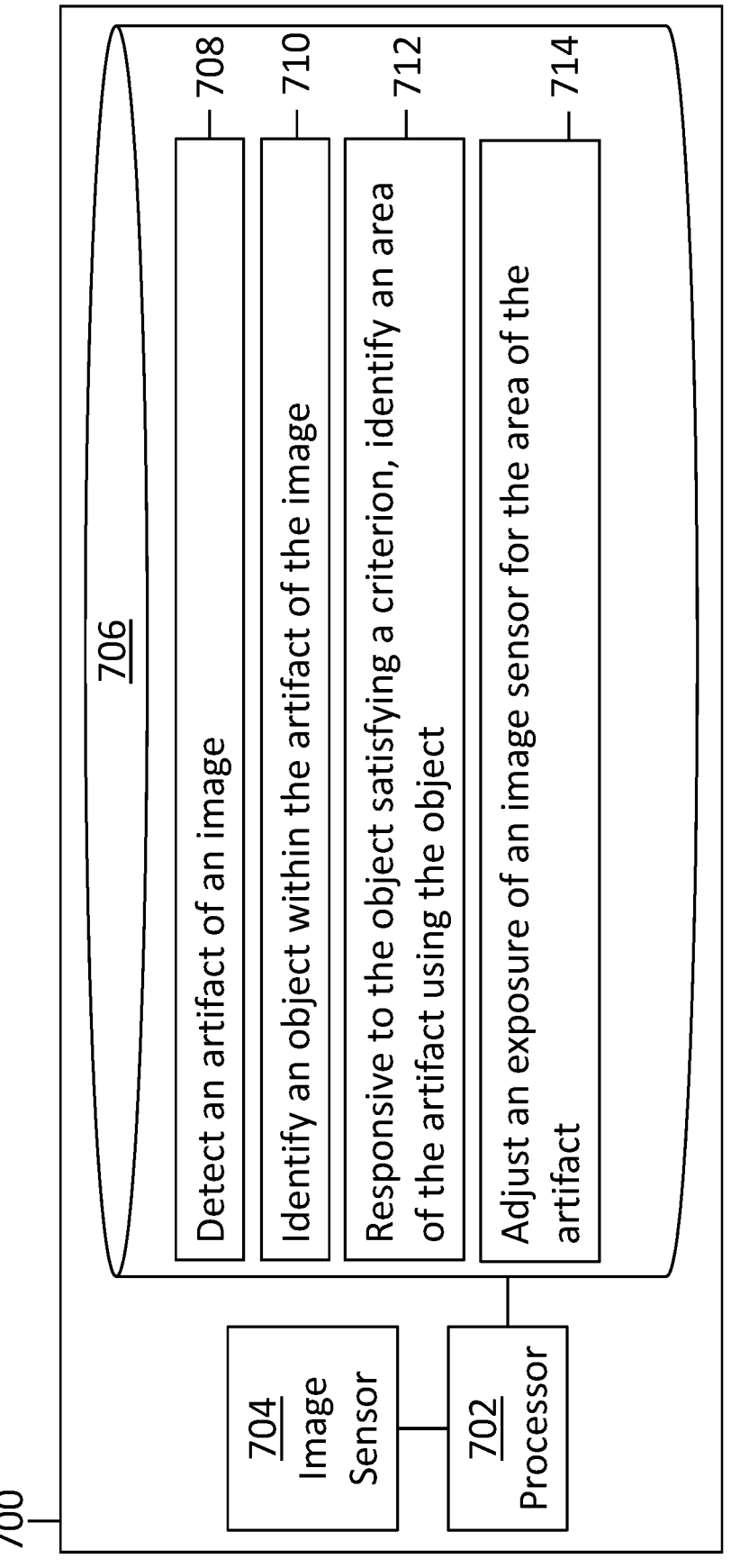
FIG. 7 is a schematic diagram depicting an electronic device for adjusting exposures of areas of an image sensor, in accordance with various examples.

Referring now to FIG. 7, a schematic diagram depicting an electronic device 700 for adjusting exposures of areas of an image sensor 704 is provided, in accordance with various examples. The electronic device 700 may be the electronic device 400. The image sensor 704 may be the image sensor 404. The electronic device 700 includes a processor 702, the image sensor 704, and a storage device 706. The processor 702 may be the processor 402. The storage device 706 may be the storage device 406.

In some examples, the processor 702 couples to the image sensor 704 and the storage device 706. The storage device 706 stores machine-readable instructions which, when executed by the processor 702, cause the processor 702 to perform some or all of the actions attributed herein to the processor 702. The machine-readable instructions are the machine-readable instructions 708, 710, 712, 714.

In various examples, the machine-readable instructions 708, 710, 712, 714, when executed by the processor 702, cause the processor 702 to adjust an exposure of an area of the image sensor 704. The machine-readable instruction 708, when executed by the processor 702, causes the processor 702 to detect an artifact (e.g., the saturated highlight 206, 208) of an image (e.g., the image 200, 210). The image is captured via the image sensor 704. The machine-readable instruction 710, when executed by the processor 702, causes the processor 702 to identify an object (e.g., the light source 202, 204) within the artifact of the image. In response to the object satisfying a criterion, the machine-readable instruction 712, when executed by the processor 702, causes the processor 702 to identify an area of the artifact using the object. The criterion is that the object is stationary, for example. The machine-readable instruction 714, when executed by the processor 702, causes the processor 702 to adjust an exposure of the image sensor for the area of the artifact. The processor 702 adjusts the exposure of the image sensor for the area indicated by a mask, as described above with respect to FIG. 3.

In some examples, electronic device 700 performs the method 600. For example, the method 600 is implemented by machine-readable instructions stored to the storage device 706. The processor 702 executes the machine-readable instructions to perform the method 600. In various examples, when executed by the processor 702, the machine-readable instruction 708 causes the processor 702 to perform the detect process 606. When executed by the processor 702, the machine-readable instruction 710 causes the processor 702 to perform the identify process 608. When executed by the processor 702, the machine-readable instruction 712 causes the processor 702 to perform the decision point 610, the identify process 612, or a combination thereof. When executed by the processor 702, the machine-readable instruction 714 causes the processor 702 to perform the adjust process 614. In various examples, during the receive process 616, the processor 702 receives another image captured via the image sensor 704, the another image having a first exposure for the area of the artifact identified during the identify process 612 and a second exposure for a remaining area of the another image. During the combine process 618, the processor 702 combines the image stored during the store process 604 with the another image to generate a combined image. The processor 702 causes a display device (not explicitly shown) to display the combined image, a network interface (not explicitly shown) to transmit the combined image, or a combination thereof.

In some examples, to detect the artifact, the processor 702 compared the image to a previous image. For example, the processor 702 compared a grayscale of the image to a grayscale of the previous image. The processor 702 detects the artifact by identifying a shared area of the grayscale of the image and the grayscale of the previous image having the smallest value of the range of tonal values, where the smallest value of the range of tonal values may indicate a crushed shadow. In another example, the processor 702 compares a histogram of the image to a histogram of the previous image. The processor 702 detects the artifact by identifying a shared area of the histogram of the image and the histogram of the previous image having the largest value of the range of tonal values, where the largest value of the range of tonal values may indicate a saturated highlight.

In various examples, to identify the area of the artifact using the object, the processor 702 performs a thresholding of the image and compare the thresholding of the image to a thresholding of the previous image. The processor 702 identifies the area by identifying a shared area of the artifact within the thresholding of the image and the thresholding of the previous image. In some examples, the previous image, the grayscale of the previous image, the histogram of the previous image, the thresholding of the previous image, or a combination thereof are stored to the storage device 706.

In some examples, the criterion is that the artifact is a distraction. Responsive to a determination that the artifact is a distraction, the processor 702 identifies the object within the artifact of the image. For example, responsive to a determination that a number of pixels (e.g., a size) of the artifact exceeds a number of pixels of another object that is contiguous to the artifact, the processor determines that the artifact is a distraction. In another example, responsive to a determination that an amount of contrast between a color value of the artifact and a color value of the another object that is contiguous to the artifact exceeds a contrast threshold, the processor determines that the artifact is a distraction. The amount of contrast, as used herein, is a difference between the color value of the artifact and the color value of the another object. For example, responsive to a determination that the contrast between the color value of the artifact and the color value of the another object exceeds a contrast threshold of fifty, the processor determines that the artifact is a distraction. In other examples, the artifact partially overlaps the another object. In various examples, the value utilized by the electronic device to determine whether the artifact is a distraction, the type of artifact to detect, or a combination thereof are adjustable. For example, utilizing the GUI of the executable code, the user adjusts the number of pixels, the amount of contrast, or a combination thereof that the artifact is to exceed for the processor to determine that the artifact is a distraction. In another example, utilizing the GUI of the executable code, the user adjusts the type of artifact to detect.

In various examples, to generate a combined image, the processor 702 utilizes a Wide Dynamic Range (WDR) technique, a High Dynamic Range (HDR) technique, or a combination thereof. In other examples, to generate the combined image, the processor 702 replaces the area of the artifact of the first image with the adjusted exposure area of the second image captured by the image sensor 704 having the adjusted exposure. For example, the processor 702 replaces the pixels of the area of the artifact of the first image with pixels having the same coordinates within the second image. In some examples, to generate the combined image, the processor 702 averages a tonal value of each pixel of the area of the artifact of the first image with a tonal value of a corresponding pixel of the second image. By replacing the area of the artifact of the first image with the adjusted exposure area of the second image, averaging the tonal values of the area of the artifact with the tonal values of the corresponding area of the second image, or a combination thereof, the electronic device reduces an appearance of crushed shadows in the combined image.

Figure 8B:
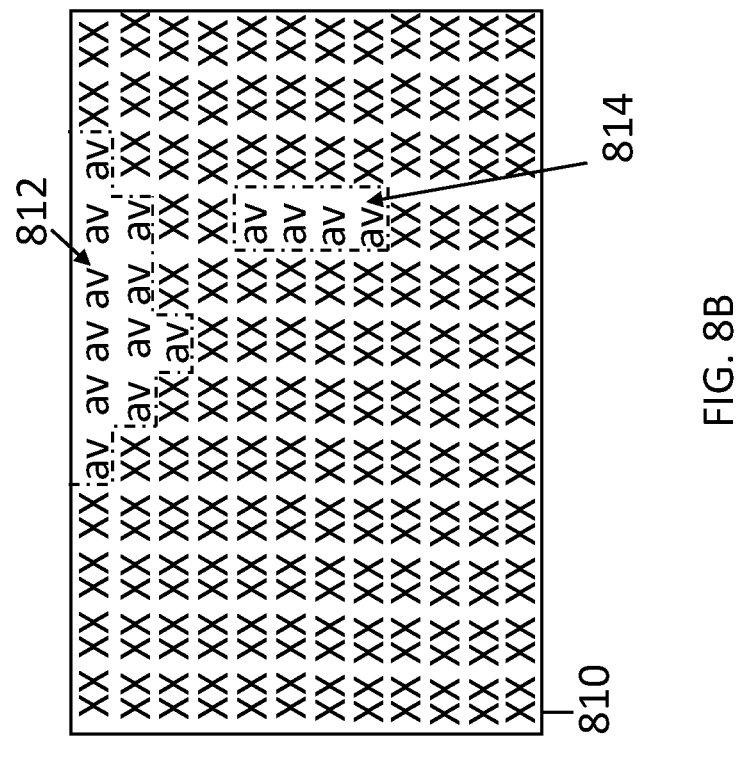
FIGS. 8A and 8B are examples of areas of an image sensor, in accordance with various examples.
Figure 8A:
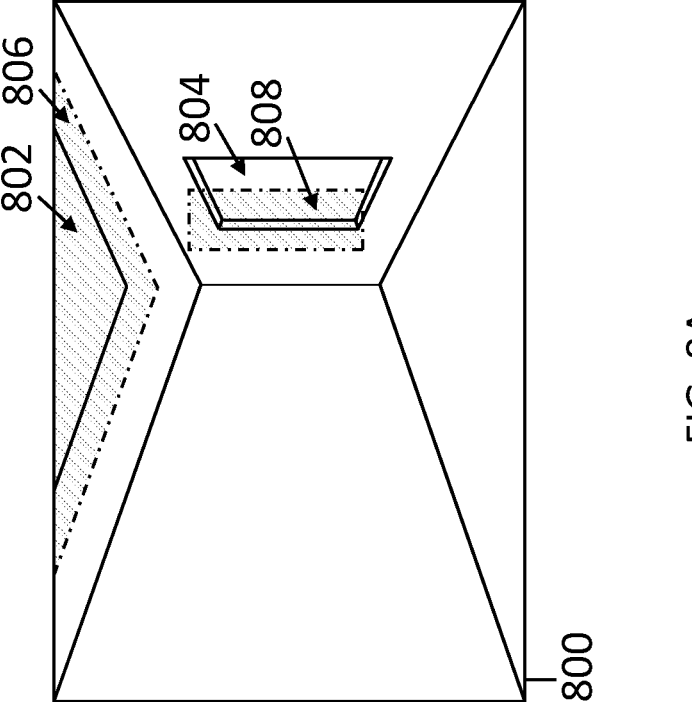

Referring now to FIGS. 8A and 8B, examples of images 800, 810 captured by an image sensor (e.g., the image sensor 404, 704) are provided, in accordance with various examples. FIG. 8A shows the image 800. The image 800 is an image of a physical environment of the image sensor. The image 800 includes light sources 802, 804 and areas 806, 808. The areas 806, 808 are areas having an adjusted exposure, as indicated by the diagonal gray lines. FIG. 8B shows the image 810. The image 810 includes areas 812, 814. The areas 812, 814 may be the areas 806, 808, respectively. The pixels of the areas 812, 814 have averaged values, as indicated by "av." The values of the remaining areas of the image 810 are represented by XX to indicate values not having averaged values.

In some examples, the image 800 is a subsequent video frame to a video frame represented by the image 200. The light sources 802, 804 is the light sources 202, 204, respectively. The areas 806, 808 are areas of artifacts (e.g., the saturated highlights 206, 208, respectively). The areas 806, 808 having diagonal gray lines indicate that an electronic device (e.g., the electronic device 400, 700) adjusted an exposure of the image sensor for the areas. By correcting the artifacts in the image 200, the electronic device enhances a visibility of the physical environment of the image sensor without the user taking corrective actions. Additionally, the user and audience experiences are enhanced by eliminating the awkwardness that would otherwise occur while the user takes the corrective action. By automatically correcting the artifacts, the electronic device enhances user productivity.

Figure 9:
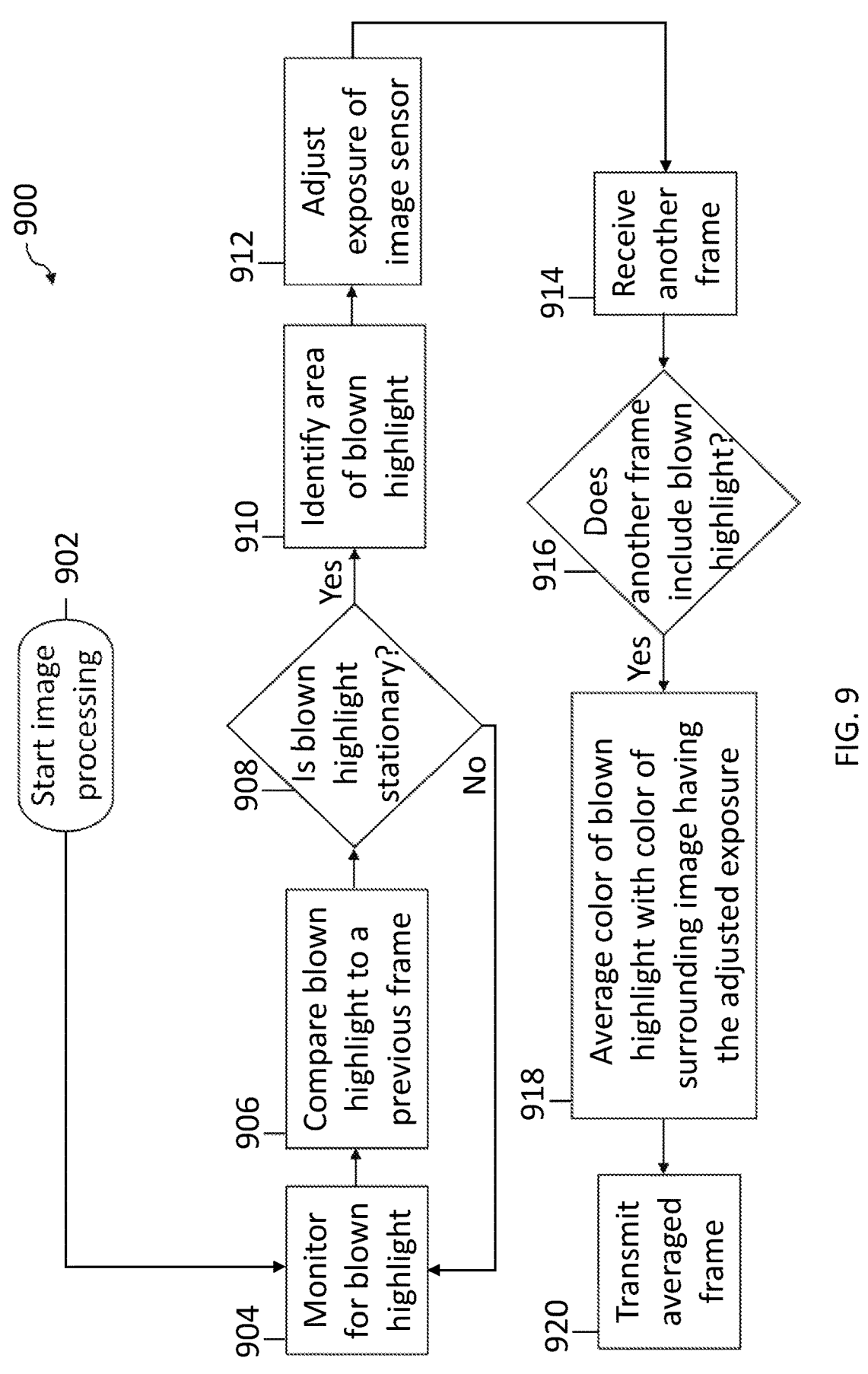
FIG. 9 is a flow diagram of a method for adjusting exposures of areas of an image sensor, in accordance with various examples.

Referring now to FIG. 9, a flow diagram of a method 900 for adjusting exposures of areas of an image sensor (e.g., the image sensor 404, 704) is provided, in accordance with various examples. At a start point 902 of the method 900, a processor (e.g., the processor 402, 702) of an electronic device (e.g., the electronic device 400, 700) starts image processing. At the start point 902, the processor receives a video signal captured by the image sensor. During a monitor process 904 of the method 900, the processor monitors the video signal for a frame including a saturated highlight (e.g., the saturated highlight 206, 208). During a compare process 906 of the method 900, the processor compares the frame including the saturated highlight to a previous frame. The processor determines at a decision point 908 whether the saturated highlight is stationary based on the comparison. Responsive to a determination that the saturated highlight is not stationary, the processor returns to the monitor process 904 to monitor the video signal for another saturated highlight. Responsive to a determination that the saturated highlight is stationary, the processor identifies an area of the saturated highlight during an identify process 910 of the method 900. During an adjust process 912 of the method 900, the processor adjusts an exposure of an area of the image sensor. The processor receives another frame of the video signal during a receive process 914 of the method 900. During a decision point 916, the processor determines whether the another frame includes the saturated highlight. Responsive to a determination that the another frame includes the saturated highlight, during an average process 918, the processor replaces a color value of a pixel of the saturated highlight of the another frame by calculating an average of the color value of a pixel of the saturated highlight and a color value of a pixel that is contiguous to the saturated highlight and that has the adjusted exposure. During a display process 920 of the method 900, the processor causes a display device to display the averaged another frame, a network interface to transmit the averaged another frame, or a combination thereof.

In some examples, during the average process 918, the processor replaces the color value of the pixel that is contiguous to the saturated highlight and that has the adjusted exposure by calculating an average of the color value of the pixel that is contiguous to the saturated highlight and that has an adjusted exposure and a color value of another pixel that is contiguous to the saturated highlight and the pixel that is contiguous to the saturated highlight and that has the adjusted exposure. In other examples, during the average process 918, the processor replaces the color value of the pixel that is contiguous to the saturated highlight and that has the adjusted exposure by calculating an average of the color value of the pixel that is contiguous to the saturated highlight and that has an adjusted exposure and a color value of another pixel that is contiguous to the pixel that is contiguous to the saturated highlight and that has the adjusted exposure. In various examples, the processor repeats the average process 918 for each pixel of the saturated highlight. In other examples, the processor repeats the average process 918 for each pixel contiguous to area of the saturated highlight. In some examples, the processor repeats the average process 918 for each pixel contiguous to each pixel contiguous to the area of the saturated highlight. The processor repeats the average process 918 to average an area that is a percentage larger than the area of the saturated highlight, that overlaps the area of the saturated highlight, and that is contiguous to the area of the saturated highlight.

Figure 11B:
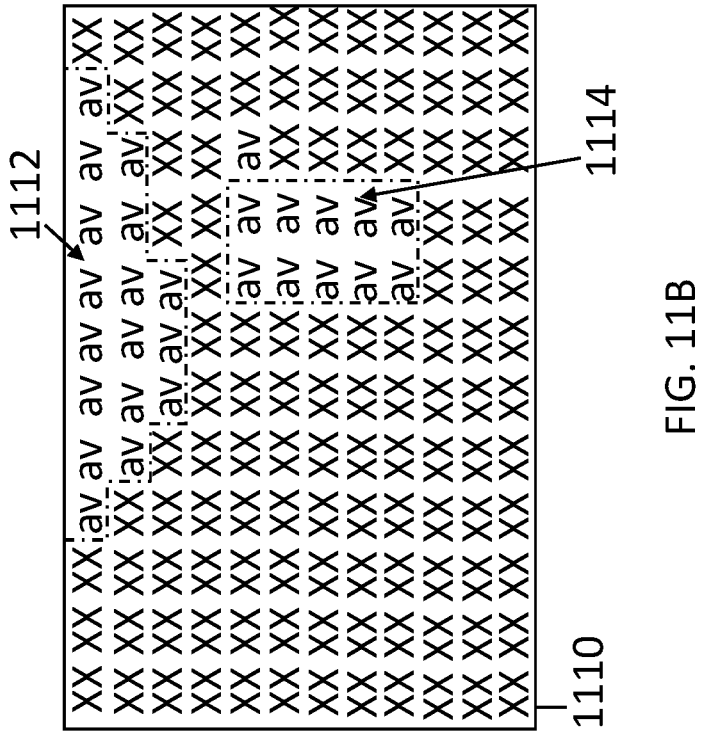
FIGS. 11A and 11B are examples of areas of an image sensor, in accordance with various examples.
Figure 11A:
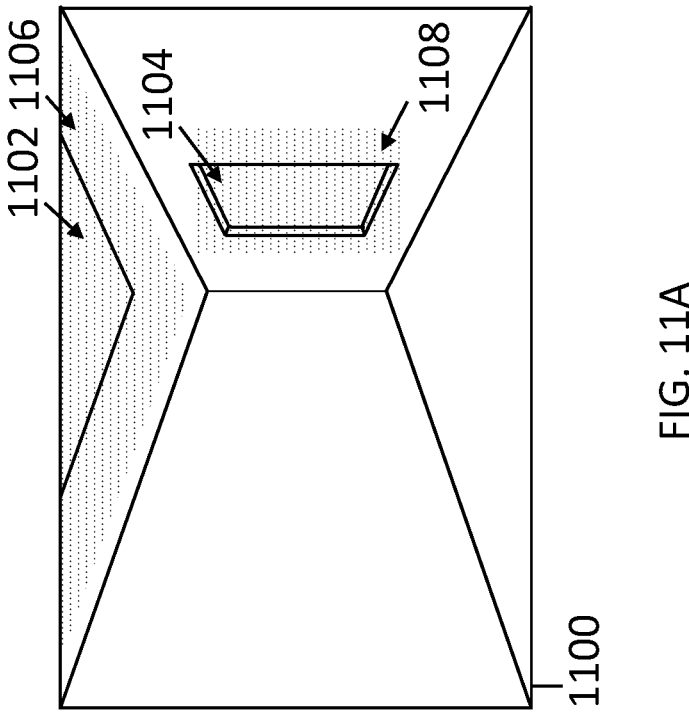

For example, the processor determines an area that expands the area of the saturated highlight by five percent and perform the average process 918 for the area. Refer to FIGS. 11A and 11B below for an example of the processor averaging an area that is larger than the area of the saturated highlight, that overlaps the area of the saturated highlight, and that is contiguous to the saturated highlight.

Figure 10:
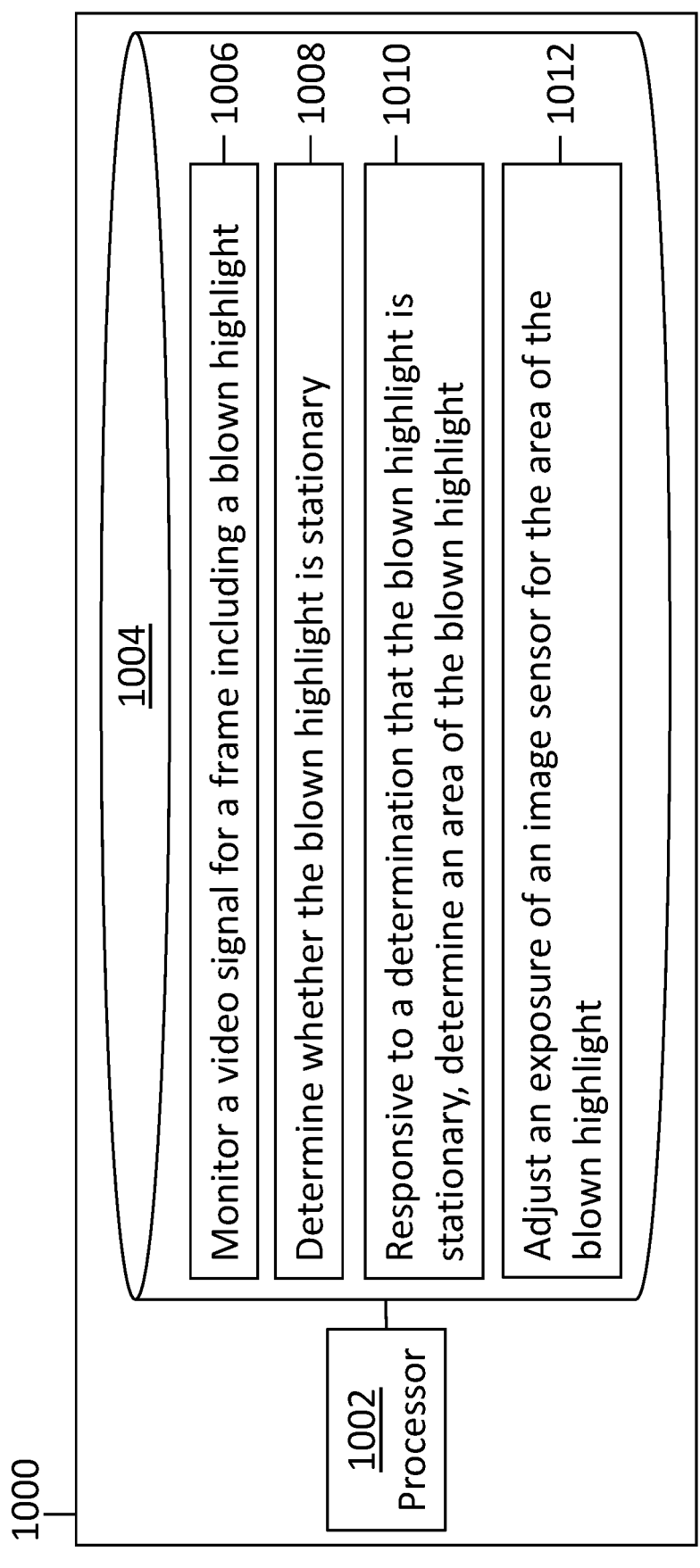
FIG. 10 is a schematic diagram depicting an electronic device for adjusting exposures of areas of an image sensor, in accordance with various examples.

Referring now to FIG. 10, a schematic diagram depicting an electronic device 1000 for adjusting exposures of areas of an image sensor (e.g., the image sensor 404, 704) is provided, in accordance with various examples. The electronic device 1000 may be the electronic device 400, 700. The electronic device 1000 comprises a processor 1002 and a non-transitory machine-readable medium 1004. The processor 1002 may be the processor 402, 702. The non-transitory machine-readable medium 1004 may be the storage device 406, 706. The term "non-transitory" does not encompass transitory propagating signals.

In various examples, the electronic device 1000 comprises the processor 1002 coupled to the non-transitory machine-readable medium 1004. The non-transitory machine-readable medium 1004 stores machine-readable instructions. The machine-readable instructions are the machine-readable instructions 1006, 1008, 1010, 1012. The machine-readable instructions 1006, 1008, 1010, 1012 when executed by the processor 1002, causes the processor 1002 to perform some or all of the actions attributed herein to the processor 1002.

In various examples, when executed by the processor 1002, the machine-readable instructions 1006, 1008, 1010, 1012 cause the processor 1002 to correct adjust exposures of areas of the image sensor. The machine-readable instruction 1006 causes the processor 1002 to monitor a video signal for a frame that includes a saturated highlight. The video signal is received via the image sensor. The machine-readable instruction 1008 causes the processor 1002 to determine whether the saturated highlight is stationary. Responsive to a determination that the saturated highlight is stationary, the machine-readable instruction 1010 causes the processor 1002 to determine an area of the saturated highlight. The machine-readable instruction 1012 causes the processor 1002 to adjust an exposure of the image sensor for the area of the saturated highlight.

In some examples, electronic device 1000 performs the method 900. For example, the method 900 is implemented by machine-readable instructions stored to the non-transitory machine-readable medium 1004. The processor 1002 executes the machine-readable instructions to perform the method 900. In various examples, when executed by the processor 1002, the machine-readable instruction 1006 causes the processor 1002 to perform the monitor process 904. When executed by the processor 1002, the machine-readable instruction 1008 causes the processor 1002 to perform the decision point 908. When executed by the processor 1002, the machine-readable instruction 1010 causes the processor 1002 to perform the identify process 910. When executed by the processor 1002, the machine-readable instruction 1012 causes the processor 1002 to perform the adjust process 912. In various examples, during the receive process 914, the processor 1002 receives another frame captured via the image sensor. In various examples, the another frame includes a first exposure for the area of the saturated highlight identified during the identify process 910 and a second exposure for a remaining area of the another frame. During the average process 918, the processor 1002 averages color values of the first exposure and color values of the second exposure to generate an averaged frame. The processor 1002 causes a display device (not explicitly shown) to display the averaged frame, a network interface (not explicitly shown) to transmit the averaged frame, or a combination thereof.

In various examples, in response to the determination that the saturated highlight is stationary, the machine-readable instructions, when executed by the processor 1002, cause the processor 1002 to determine whether the saturated highlight satisfies a criterion. In some examples, the criterion is based on a size, a color, or a combination thereof of the saturated highlight. For example, responsive to a determination that a size (e.g., a number of pixels) of the saturated highlight exceeds a size of another object that is contiguous to the saturated highlight, the processor 1002 determines that the saturated highlight is a distraction. In another example, responsive to a determination that an amount of contrast between a color value of the saturated highlight and a color value of the another object that is contiguous to the saturated highlight exceeds a saturation threshold, the processor 1002 determines that the saturated highlight is a distraction. In various examples, the saturated highlight is contiguous to and partially overlap the another object. In response to a determination that the saturated highlight satisfies the criterion, the machine-readable instructions, when executed by the processor 1002, cause the processor 1002 to determine the area of the saturated highlight.

In other examples, the machine-readable instructions, when executed by the processor 1002, cause the processor 1002 to receive another frame of the video signal, determine whether the another frame includes the saturated highlight, and in response to a determination that the another frame includes saturated highlight, calculate an average color for pixels of the saturated highlight. For example, the processor 1002 replaces the color value of the pixel that is contiguous to the saturated highlight and that has the adjusted exposure by calculating an average of the color value of the pixel that is contiguous to the saturated highlight and that has an adjusted exposure and a color value of another pixel that is contiguous to the saturated highlight and the pixel that is contiguous to the saturated highlight and that has the adjusted exposure. In another example, the processor 1002 replaces the color value of the pixel that is contiguous to the saturated highlight and that has the adjusted exposure by calculating an average of the color value of the pixel that is contiguous to the saturated highlight and that has an adjusted exposure and a color value of another pixel that is contiguous to the pixel that is contiguous to the saturated highlight and that has the adjusted exposure.

In various examples, the machine-readable instructions, when executed by the processor 1002, cause the processor 1002 to determine a second area that is a percentage threshold larger than the area of the saturated highlight, that overlaps the area of the saturated highlight, and that is contiguous to the area of the saturated highlight, and to calculate an average color for pixels of the second area. For example, the processor 1002 determines an area that expands the area of the saturated highlight by 2.5 percent and performs the average process for the 2.5% larger area. In various examples, the percentage threshold is adjustable. For example, the user adjusts the percentage threshold utilizing a GUI of an executable code.

In some examples, the method 300, 600, 900 is implemented by machine-readable instructions stored to a storage device (e.g., the storage device 406, 706, the non-transitory machine-readable medium 1004) of an electronic device (e.g., the electronic device 400, 700, 1000). A processor (e.g., the processor 402, 702, 1002) of the electronic device executes the machine-readable instructions to perform the method 300, 600, 900. Unless infeasible, some or all of the blocks (e.g., process, decision point) of the method 300, 600, 900 may be performed concurrently or in different sequences. For example, the processor performs a block that occurs responsive to a command sequential to the block describing the command. In another example, the processor performs a block that depends upon a state of a component after the state of the component is enabled.

While in the examples described above, the method 300, 600, 900 describe a single iteration of the method 300, 600, 900, in other examples, the electronic device performs the method 300, 600, 900 for multiple iterations. For example, the electronic device performs the method 300, 600, 900 until a percentage of the image has gray values that are below a gray threshold. The percentage is 80% and the gray threshold is 250, for example. In various examples, the user adjusts the percentage threshold and the gray threshold utilizing a GUI of an executable code.

In various examples describing adjustable thresholds and settings, initial values for the thresholds and settings are determined during a manufacture process. As described above in various examples, an executable code provides a GUI to enable a user of an electronic device (e.g., the electronic device 400, 700, 1000) to adjust the thresholds and settings related to adjusting an exposure of an image sensor (e.g., the image sensor 404, 704). The thresholds and settings are stored to a storage device (e.g., the storage device 406, 706, the non-transitory machine-readable medium 1004) of the electronic device, in various examples.

Referring now to FIGS. 11A and 11B, examples of frames 1100, 1110 of a video signal captured by an image sensor (e.g., the image sensor 404, 704) are provided, in accordance with various examples. FIG. 11A shows the frame 1100. The frame 1100 is a frame of the video signal of a physical environment of the image sensor. The frame 1100 includes light sources 1102, 1104 and areas 1106, 1108. The areas 1106, 1108 are areas having an adjusted exposure, as indicated by the gray-lined area. FIG. 11B shows the frame 1110. The frame 1110 includes areas 1112, 1114. The areas 1112, 1114 may be the areas 1106, 1108, respectively. The pixels of the areas 1112, 1114 have averaged values, as indicated by "av." The values of the remaining areas of the frame 1110 are represented by XX to indicate values not having averaged values.

In some examples, the frame 1100 is subsequent frame to a frame represented by the image 200. The light sources 1102, 1104 are the light sources 202, 204, respectively. The areas 1106, 1108 are areas of the saturated highlights 206, 208, respectively. The areas 1106, 1108 having the gray lines and the areas 1112, 1114 having color values of "av" indicate that an electronic device (e.g., the electronic device 400, 700, 1000) adjusted an exposure of the image sensor for the areas 1106, 1108 by averaging an area that is larger than the area of the saturated highlight, that overlaps the area of the saturated highlight, and that is contiguous to the saturated highlight. By correcting the saturated highlights 206, 208 in the frame 1100 by averaging color values of the saturated highlights 206, 208 with color values of pixels surrounding the saturated highlights 206, 208, respectively, the electronic device enhances a visibility of the physical environment of the image sensor by muting a saturation of the area without the user taking corrective actions. Additionally, the user and audience experiences are enhanced by eliminating the awkwardness that would otherwise occur while the user takes the corrective action. By automatically correcting the saturated highlights, the electronic device enhances user productivity.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component is omitted.

In the above description and in the claims, the term "comprising" is used in an open-ended fashion, and thus should be interpreted to mean "including, but not limited to . . . " Also, the term "couple" or "couples" is intended to be broad enough to encompass both direct and indirect connections. Thus, if a first device couples to a second device, that connection is through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
   a processor to:
      detect a saturated highlight of a video frame, wherein the saturated highlight is a pixel of the video frame that has a largest tonal value of a range of tonal values;
      in response to the detection, determine whether the saturated highlight is stationary:
      in response to a determination that the saturated highlight is stationary, identify an area of the saturated highlight; and
      adjust an exposure of an image sensor for the area of the saturated highlight.

2. The electronic device of claim 1, wherein the processor is to:
   receive another video frame; and
   cause a display device to display the another video frame, a network interface to transmit the another video frame, or a combination thereof.

3. The electronic device of claim 2, wherein the another video frame has a first exposure for the area of the saturated highlight and a second exposure for a remaining area of the another video frame.

4. The electronic device of claim 1, wherein to adjust the exposure of the image sensor for the area of the saturated highlight the processor is to generate a mask so that the image sensor has a first exposure for a first area of a field of view of the image sensor and a second exposure for a remaining area of the field of view of the image sensor.

5. The electronic device of claim 4, wherein the first area of the field of view of the image sensor corresponds to the area of the saturated highlight.

6. The electronic device of claim 1, wherein the processor is to detect the saturated highlight, identify the area of the saturated highlight, or a combination thereof using an image processing technique, a machine learning technique, or a combination thereof.

7. The electronic device of claim 6, wherein the machine learning technique is trained by images having saturated highlights; images having white objects, naturally bright regions, or a combination thereof; images having expected brightness and distribution; or some combination thereof.

8. The electronic device of claim 6, wherein the machine learning technique is trained to detect the saturated highlight, identify the saturated highlight, or a combination thereof.

9. The electronic device of claim 1, wherein the processor to identify the area of the saturated highlight includes the processor to perform thresholding on the video frame to segment the saturated highlight from a remaining portion of the video frame.

10. The electronic device of claim 9, wherein the thresholding comprises converting pixels having values less than a tonal threshold to black, and wherein the tonal threshold is adjustable.

11. An electronic device, comprising:
a processor to:
    detect an artifact of an image, wherein the artifact is an area of the image that has a largest or smallest value of a range of tonal values;
    in response to the detection, determine whether the artifact is stationary;
    in response to a determination that the artifact is stationary, identify an object within the artifact of the image;
    in response to determining that the object satisfies a criterion, identify an area of the artifact using the object; and
    adjust an exposure of an image sensor for the area of the artifact.

12. The electronic device of claim 11, wherein the artifact is a saturated highlight or a crushed shadow.

13. The electronic device of claim 11, wherein the criterion is that a first size of the artifact exceeds a second size of another object that is contiguous to the artifact, that an amount of contrast between a first color value of the artifact and a second color value of the another object that is contiguous to the artifact exceeds a threshold, or a combination thereof.

14. The electronic device of claim 11, wherein the processor is to:
    receive another image via the image sensor;
    combine the image and the another image to generate a combined image; and
    cause a display device to display the combined image, a network interface to transmit the combined image, or a combination thereof.

15. The electronic device of claim 14, wherein, to generate the combined image, the processor is to utilize a Wide Dynamic Range (WDR) technique, a High Dynamic Range (HDR) technique, or a combination thereof.

16. A non-transitory machine-readable medium storing machine-readable instructions which, when executed by a processor, cause the processor to:
    monitor a video signal for a frame that includes a saturated highlight, wherein the saturated highlight is an area of the frame that has a largest value of a range of tonal values, the video signal received from an image sensor;
    in response to receiving the frame that includes the saturated highlight, determine whether the saturated highlight is stationary;
    in response to a determination that the saturated highlight is stationary, determine an area of the saturated highlight; and
    adjust an exposure of the image sensor for the area of the saturated highlight.

17. The non-transitory machine-readable medium of claim 16, wherein, in response to the determination that the saturated highlight is stationary, the machine-readable instructions, when executed by the processor, cause the processor to:
    determine whether the saturated highlight satisfies a criterion;
    in response to a determination that the saturated highlight satisfies the criterion, determine the area of the saturated highlight; and
    adjust an exposure of the image sensor for the area of the saturated highlight.

18. The non-transitory machine-readable medium of claim 17, wherein the criterion is based on a size, a color, or a combination thereof of the saturated highlight.

19. The non-transitory machine-readable medium of claim 16, wherein the machine-readable instructions, when executed by the processor, cause the processor to:
    receive another frame of the video signal;
    determine whether the another frame includes the saturated highlight; and
    in response to a determination that the another frame includes saturated highlight, calculate an average color for pixels of the saturated highlight.

20. The non-transitory machine-readable medium of claim 19, wherein the machine-readable instructions, when executed by the processor, cause the processor to:
    determine a second area that is a percentage threshold larger than the area of the saturated highlight, that overlaps the area of the saturated highlight, and that is contiguous to the area of the saturated highlight; and
    calculate a second average color for pixels of the second area.

\* \* \* \* \*